United States Patent [19]

Scarrow

[11] Patent Number: 5,404,993

[45] Date of Patent: Apr. 11, 1995

[54] COLLAPSIBLE AUGER CONVEYOR HOPPER BOTTOM

[75] Inventor: Dennis A. Scarrow, Spy Hill, Canada

[73] Assignee: FAB TEC Manufacturing Ltd., Saskatchewan, Canada

[21] Appl. No.: 179,210

[22] Filed: Jan. 10, 1994

[51] Int. Cl.⁶ ............................................. B65G 65/34
[52] U.S. Cl. .................. 198/550.2; 198/311; 198/550.1; 414/376; 414/573
[58] Field of Search .................. 198/311, 550.1, 550.2; 414/376, 573, 574

[56] References Cited

U.S. PATENT DOCUMENTS 2,415,013  12/1945  Kubitz .
3,035,682  2/1960   Ferch .
3,059,754  5/1961   Mighell .
3,203,532  8/1965   Mimnaugh et al. .
3,435,941  2/1967   Mayrath .
3,729,087  4/1973   Bruns .

Primary Examiner—Joseph E. Valenza
Attorney, Agent, or Firm—Murray E. Thrift; Adrian D. Battison; Stanley G. Ade

[57] ABSTRACT

A collapsible hopper is used with a conveyor, for example a grain auger. The hopper is fastened onto the bottom end of the auger to surround the inlet. It has a flaccid side wall that is normally supported in a raised condition by a top, rigid hoop connected to the hopper base by a pair of springs. The springs allow the hoop to be deflected downwardly when engaged by another object, for example a truck box when it is dumping into the hopper. An over-center linkage allows the springs to be released so that the flaccid hopper wall can collapse, allowing insertion of the hopper in this collapsed state into a position where there is insufficient clearance to insert the fully-raised hopper.

10 Claims, 3 Drawing Sheets

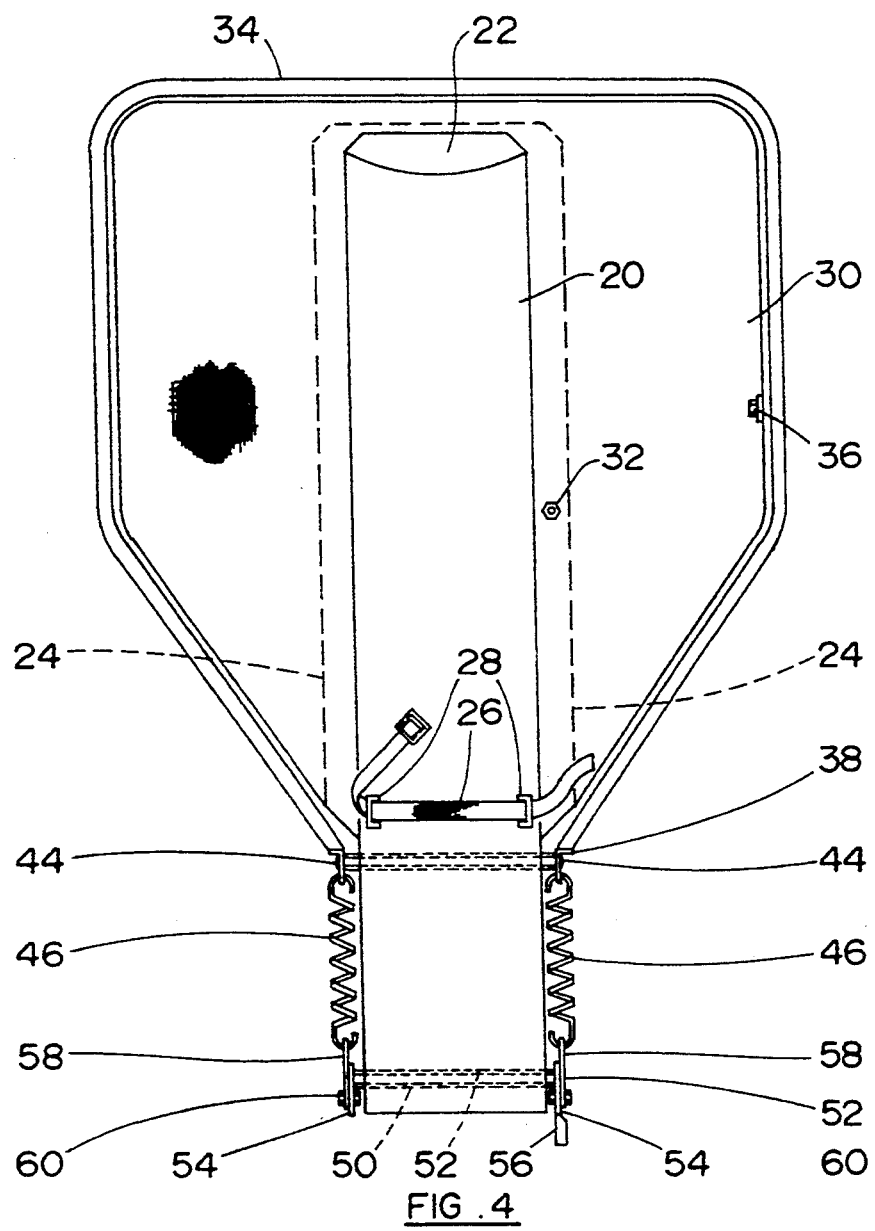
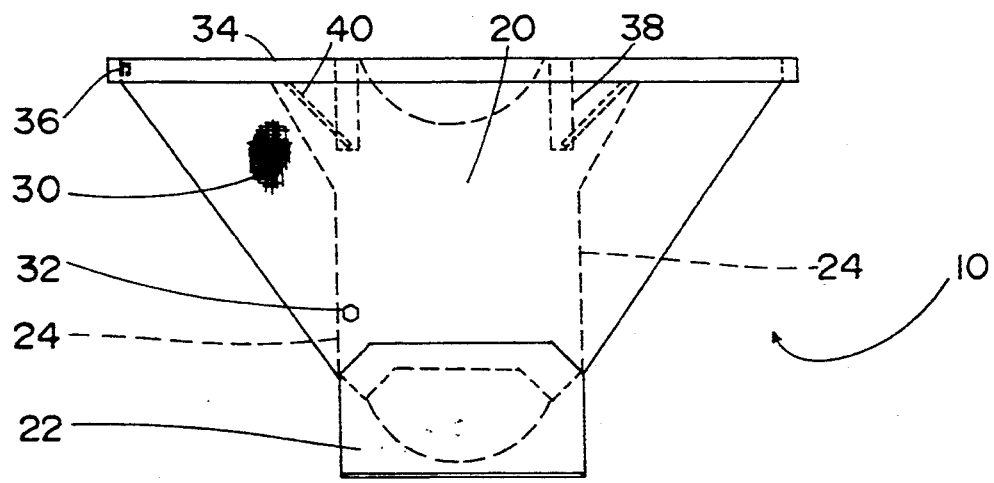
FIG. 4
FIG. 5

COLLAPSIBLE AUGER CONVEYOR HOPPER BOTTOM

FIELD OF THE INVENTION

The present invention relates to a collapsible hopper for the intake end of a conveyor, for example a grain auger.

BACKGROUND

Different types of collapsible hoppers for conveyors have been proposed. These are meant to collapse when pushed downwardly. This may happen, for example, when the end of a dump truck box is lowered onto the hopper while dumping material into the hopper.

One common collapsible hopper is made of a resilient plastic material. As a truck box presses down on such a hopper, the material yields and deforms elastically. After repeated deformations however, the material takes a set in the collapsed configuration and is no longer useful for its intended purpose.

Other proposals include a flaccid hopper with a resilient frame around its upper periphery and a long compression spring and curved rod system for supporting the frame above the auger inlet. This is a complex system employing multiple sliding and pivoting joints that may be subject to binding.

SUMMARY

The present invention relates to a simple, effective hopper that mitigates the problems of the prior art.

According to one aspect of the present invention there is provided a hopper for attachment to a particulate material conveyor having an inlet adjacent a bottom end thereof, said hopper comprising:

a base configured to engage the conveyor adjacent the inlet thereof;

a peripheral hopper wall secured to the base, the hopper wall being collapsible and having a bottom side adapted to at least partially surround the conveyor inlet;

frame means engaging the hopper wall at a position spaced from the bottom side and holding the wall in a peripherally stretched condition;

frame mounting means mounting the frame means on the base for pivotal movement towards and away from the bottom side of the hopper wall; and biasing means for biasing the frame means to pivot away from the bottom side of the hopper wall.

In preferred embodiments, the hopper wall is a supple or flaccid material, for example tarpaulin. The frame is a hoop or ring at the top of the wall, and the biasing means is a tension spring with an over-centre linkage that can be released to allow the frame to move to a lowered position on the base. This will allow the hopper to be inserted under a low supply, for example under a bottom discharge truck or a hopper bin where there is not enough clearance for the fully extended hopper to be put in place. Once in place, the hopper can be raised against the truck, bin or other structure.

According to another aspect of the invention there is provided, in combination, an auger including an auger tube and an inlet at a bottom end of the auger tube, and a collapsible hopper secured to the bottom end of the auger tube for delivering particulate material to the inlet, said hopper comprising:

a base comprising a trough engaging the bottom end of the auger tube, below the inlet;

a flaccid hopper wall secured to the base around the inlet;

a wall support hoop secured to the periphery of the hopper wall remote from the base;

pivot means mounting the wall support hoop on the base, with the auger inlet positioned between the pivot means and the bottom end of the auger; and spring means extending between the wall support hoop and the base to pivot the support hoop upwardly about the pivot means, to stretch the hopper wall.

BRIEF DESCRIPTION OF THE DRAWINGS

In the accompanying drawings, which illustrate an exemplary embodiment of the present invention:

FIG. 4 is a top view of the hopper; and

FIG. 5 is a bottom end view of the hopper.

DETAILED DESCRIPTION

Figure 3:
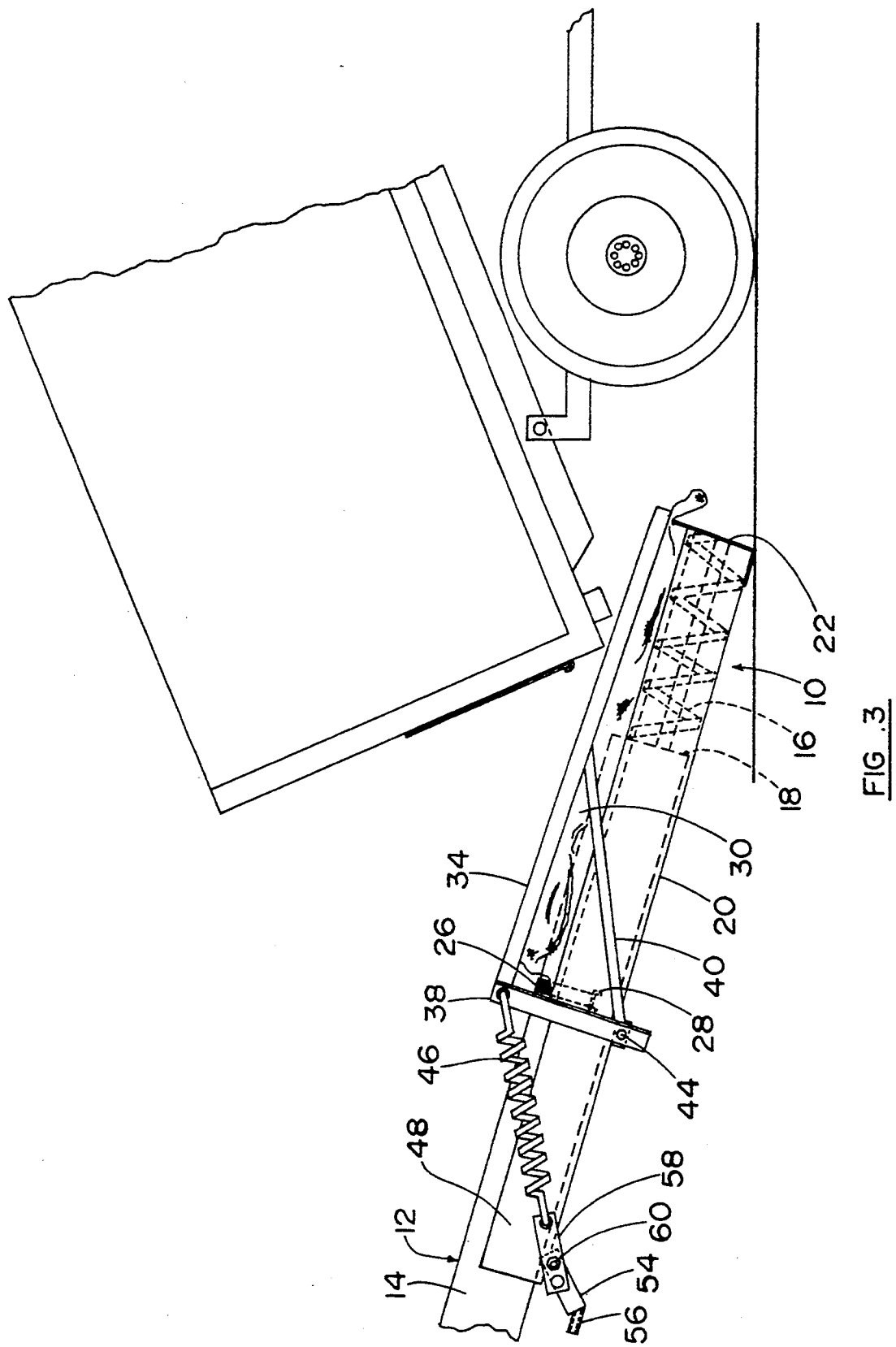
FIG. 3 is a side view of the hopper being depressed by a truck box.

Referring to the accompanying drawings, there is illustrated a hopper 10 that is intended to be used with a grain auger 12 (FIG. 3). The auger has an auger tube 14 and a conveying screw 16 extending the length of the tube for conveying material along the tube. The auger has an inlet where the screw projects from the bottom end 18 of the auger tube.

The hopper 10 includes a base in the form of an elongate trough 20 that engages over the bottom end of the auger tube and along the underside of the inlet. The bottom end of the trough 20 is closed with a kick plate 22. Extending along the trough 20 from the bottom end, are two upwardly and outwardly divergent side flanges 24.

The hopper is mounted on the auger by a retainer strap 26 that extends across the top of the auger tube just beyond the ends of the side flanges 24. The strap is threaded through two brackets 28 on opposite sides of the trough and is drawn in tight to secure the hopper in place.

An upwardly-flaring hopper wall 30 surrounds the auger inlet. The hopper wall extends along the kick plate 22 and the side flanges 24 to a position spaced up the auger from the inlet. The hopper wall is made from a heavy tarp material and is sufficiently flaccid that it will collapse without the application of significant force. The hopper wall is secured to the kick plate 22 and the side flanges 24 by fasteners 32 (one shown) spaced along the bottom edge of the wall. At the top edge of the wall is a wide hoop 34, the configuration of which is illustrated most particularly in FIG. 4, the hoop stretches the wall peripherally and is secured to the upper edge of the hopper wall by a series of fasteners 36 (one shown).

The upper ends of hoop 34 are connected to respective ones of two arms 38 that project downwardly from the ends of the hoop on opposite sides of the trough 20. The hoop is supported on the arms by two angle braces 40.

Extending across the bottom of the trough, between the arms 38 is a sleeve 42. This supports a pivot pin 44 secured to the two arms so that the assembly consisting of the arms, the braces 40 and the hoop 34 will pivot about the lateral axis of the pivot pin.

Figure 1:
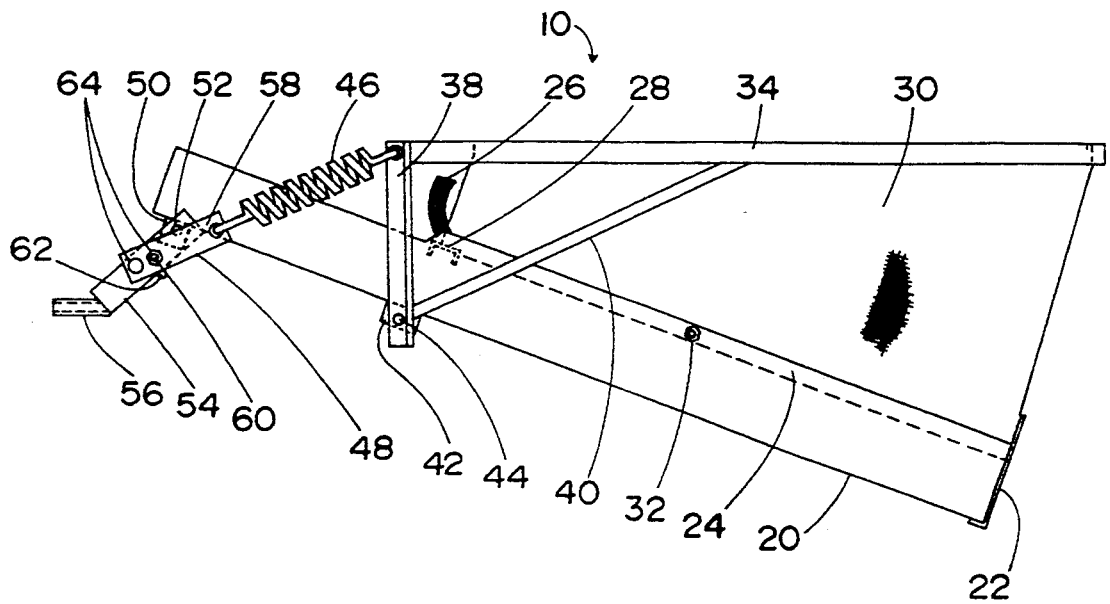
FIG. 1 is a side view of the hopper in a raised condition.

The upper ends of the arms 38 are connected to respective ones of two tension springs 46, The opposite ends of the springs are connected to an over-centre linkage 48. The over-centre linkage includes a sleeve 50 extending across the bottom of the trough near its upper end and accommodating a transverse pivot pin 52. The opposite ends of the pin 52 are connected to respective ones of two control links 54. One of these links has a control bracket 56 in the form of a sleeve projecting from its end. This bracket may be engaged by a bar or rod for pivoting the control links on the pivot retainer 50. Two over-centre links 58 are connected to the respective control links 52 by pivots 60. In the raised condition of the hopper wall illustrated in FIG. 1, the over-centre link 58 engages a stop 62 projecting from the side of the associated control link 52. Each link 58 is connected to the end of a respective one of the springs 46. In the raised condition of the hopper illustrated in FIG. 1, the springs are tensioned and the hoop is pivoted upwardly to stretch the hopper wall 30, The pivot 52 is, in this condition, positioned above a line joining the pivot 60 and the end of the spring 46 so that the spring force will retain the linkage in this condition.

Figure 2:
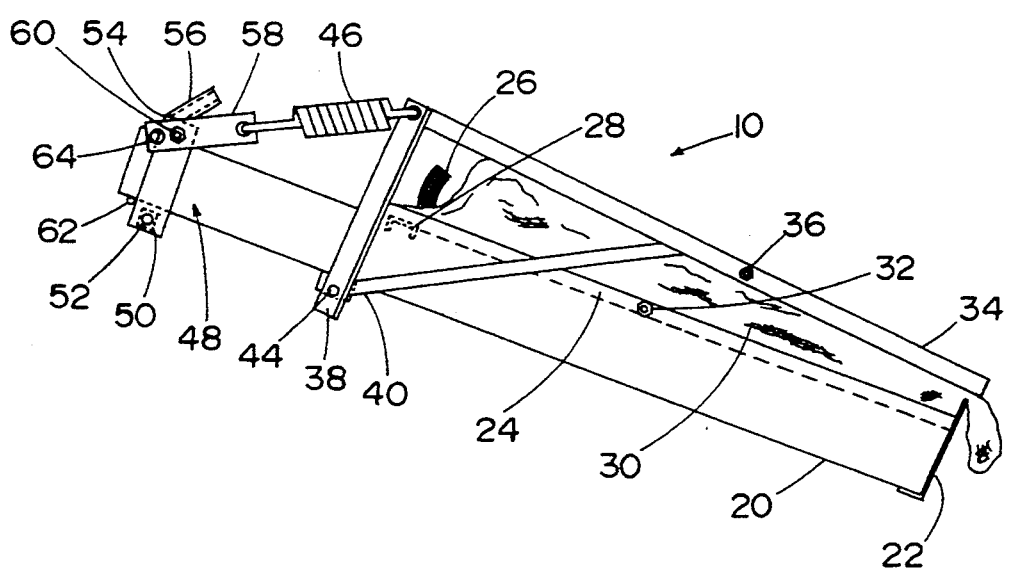
FIG. 2 is a side view of the hopper in a lowered condition.

To release the linkage, the control bracket 56 is pivoted upwardly about the pivot 54 until the line joining the spring 46 and pivot 60 passes above the pivot 54. The spring then pulls the linkage to the position illustrated in FIG. 2. The spring is then relaxed and the hoop 34 falls down around the pivot 44, causing the wall 30 to collapse as shown in FIG. 2.

The reverse pivoting movement of the control link 54 will raise the hoop and the wall 30 once more.

With the wall raised, the hoop may be deflected downwardly by engagement with another object, for example the end of a truck box, as illustrated most particularly in FIG. 3. This deflection of the hoop is allowed by the resiliency of the springs 46, which are stretched by the hoop movement.

The link 58 has two separate holes 64 for engaging the pivot 60. Selecting one hole or the other provides for adjustment of the spring tension when that is necessary.

The hopper described in the foregoing is capable of collapsing when engaged by another object, for example a truck box, and will reliably return to its raised condition when the engagement is removed, under the influence of the springs 46. Through use of the over-centre linkage 48, the springs can be relaxed, allowing the hopper wall to collapse so that the hopper, in the condition illustrated in FIG. 2, can be inserted under another object where there is insufficient clearance to insert the hopper in its fully raised condition. The hopper can then be raised using the over-centre linkage. Even if there is insufficient clearance to allow the hopper to be raised to its full extent, the hopper can be raised as far as possible because the springs 46 will yield.

While one embodiment of the present invention has been described in the foregoing, it is to be understood that other embodiments are possible within the scope of the invention, For example, the hopper described in the foregoing has been described for use in conjunction with a grain auger, which is the most commonly used agricultural conveyor. However, the hopper is useful in association with other types of conveyors as well.

The invention is to be considered limited solely by the scope of the appended claims.

I claim:

1. A hopper for attachment to a particulate material conveyor having an inlet adjacent a bottom end thereof, said hopper comprising:
   a base configured to engage the conveyor adjacent the inlet thereof;
   a peripheral hopper wall secured to the base, the hopper wall being collapsible and having a bottom side adapted to at least partially surround the conveyor inlet;
   frame means engaging the hopper wall at a position spaced from the bottom side and holding the wall in a peripherally stretched condition;
   pivot means mounted on the base at a position spaced along the hopper wall from a bottom end thereof;
   frame mounting means comprising pivot arm means rigidly secured to the frame means for movement therewith and mounting the frame means on the pivot means for pivotal movement of the frame means towards and away from the bottom side of the hopper wall; and
   biasing means for biasing the frame means to pivot away from the bottom side of the hopper wall.

2. A hopper according to claim 1 wherein the biasing means comprise bias releasing means for selectively releasing the frame means to pivot freely towards the bottom side of the hopper wall.

3. A hopper according to claim 1 wherein the base comprises a trough adapted to engage under the conveyor adjacent the bottom end thereof, and including fastening means for securing the trough on the conveyor.

4. A hopper according to claim 3 wherein the fastening means comprise a strap.

5. A hopper according to claim 1 wherein the frame means comprise a rigid hoop secured to the periphery of the hopper wall remote from the base.

6. A hopper for attachment to a particulate material conveyor having an inlet adjacent a bottom end thereof, said hopper comprising:
   a base configured to engage the conveyor adjacent the inlet thereof;
   a peripheral hopper wall secured to the base, the hopper wall being collapsible and having a bottom side adapted to at least partially surround the conveyor inlet;
   frame means engaging the hopper wall at a position spaced from the bottom side and holding the wall in a peripherally stretched condition;
   frame mounting means mounting the frame means on the base for pivotal movement towards and away from the bottom side of the hopper wall; and
   biasing means for biasing the frame means to pivot away from the bottom side of the hopper wall, the biasing means comprising tension spring means and linkage means connecting the tension spring means to the base, the linkage means having a first condition with the tension spring means stressed and a second condition with the tension spring means relaxed.

7. A hopper according to claim 6 wherein the tension spring means comprise two coil springs, one on each side of the base.

8. A hopper according to any one of claim 1 wherein the hopper wall is a flaccid material.

9. In combination, a grain auger including an auger tube and an inlet at a bottom end of the auger tube, and a collapsible hopper secured to the bottom end of the auger tube for delivering grain to the inlet, said hopper comprising:
- a trough engaging the bottom end of the auger tube, below the inlet;
- a flaccid hopper wall secured to the trough around the inlet;
- a wall support hoop secured to the periphery of the hopper wall removed from the trough;
- pivot means mounted at respective fixed positions on the wall support hoop and on the trough, with the inlet position between the pivot means and the bottom end of the auger; and
- spring means extending between the wall support hoop and the trough to pivot the support hoop upwardly about the pivot means, to stretch the hopper wall.

10. In combination, a grain auger including an auger tube and an inlet at a bottom end of the auger tube, and a collapsible hopper secured to the bottom end of the auger tube for delivering grain to the inlet, said hopper comprising:
- a trough engaging the bottom end of the auger tube, below the inlet;
- a flaccid hopper wall secured to the base around the inlet;
- a wall support hoop secured to the periphery of the hopper wall removed from the base;
- pivot means mounting the wall support hoop on the trough, with the inlet position between the pivot means and the bottom end of the auger;
- spring means extending between the wall support hoop and the trough to pivot the support hoop upwardly about the pivot means, to stretch the hopper wall; and
- linkage means coupling the spring means to the base, the linkage means being selectively moveable between a first condition tensioning the spring means and a second condition relaxing the spring means.

* * * * *